(12) United States Patent
Stojanovski

(10) Patent No.: US 9,132,488 B2
(45) Date of Patent: *Sep. 15, 2015

(54) CUTTING TOOL WITH AN ECCENTRIC DRIVE AND PINNED FASTENER WITH DE-BINDING RELEASE FEATURE

(76) Inventor: Stojan Stojanovski, Shelby Township, MI (US)

(*) Notice: Subject to any disclaimer, the term of this patent is extended or adjusted under 35 U.S.C. 154(b) by 899 days.

This patent is subject to a terminal disclaimer.

(21) Appl. No.: 13/303,412

(22) Filed: Nov. 23, 2011

(65) Prior Publication Data
US 2012/0155981 A1   Jun. 21, 2012

Related U.S. Application Data

(63) Continuation-in-part of application No. 12/400,176, filed on Mar. 9, 2009, now Pat. No. 8,360,699, which is a continuation-in-part of application No. 11/619,666, filed on Jan. 4, 2007, now Pat. No. 7,527,459.

(51) Int. Cl.
 *B23B 31/113* (2006.01)
 *B23C 5/10* (2006.01)

(52) U.S. Cl.
 CPC ............... *B23C 5/10* (2013.01); *B23B 31/113* (2013.01); *B23B 2260/034* (2013.01); *B23C 2210/02* (2013.01); *B23C 2265/12* (2013.01); *B23C 2265/16* (2013.01); *Y10T 279/17* (2015.01); *Y10T 408/907* (2015.01); *Y10T 408/95* (2015.01); *Y10T 409/30952* (2015.01)

(58) Field of Classification Search
 CPC .. B23C 5/10; B23C 2265/12; B23C 2265/16; B23C 2210/02; B23B 2260/034; B23B 31/113; Y10T 408/95; Y10T 408/907; Y10T 409/309408; Y10T 409/30952; Y10T 279/17863; Y10T 408/957; Y10T 408/94; Y10T 279/17965; Y10T 279/17957; Y10T 279/178

USPC ........ 409/232, 234; 279/89–91, 99, 102–103; 408/226, 238, 239 A, 239 R
See application file for complete search history.

(56) References Cited

U.S. PATENT DOCUMENTS

| | | | | | |
|---|---|---|---|---|---|
| 1,766,136 | A | * | 6/1930 | Markstrum | 279/89 |
| 1,824,509 | A | * | 9/1931 | Snader | 279/89 |
| 1,975,877 | A | * | 10/1934 | Thomas | 279/93 |
| 2,103,379 | A | * | 12/1937 | Oxford | 29/558 |
| 2,397,382 | A | * | 3/1946 | Smith | 403/350 |
| 4,813,829 | A | * | 3/1989 | Koppelmann | 409/136 |
| 6,109,152 | A | * | 8/2000 | Hecht | 82/160 |
| 8,360,699 | B2 | * | 1/2013 | Stojanovski | 409/232 |

FOREIGN PATENT DOCUMENTS

| | | | | |
|---|---|---|---|---|
| DE | 3344467 | A | * | 6/1985 |
| EP | 2039450 | A2 | * | 3/2009 |
| SU | 1090511 | A | * | 5/1984 |

* cited by examiner

*Primary Examiner* — Daniel Howell
(74) *Attorney, Agent, or Firm* — VanOphem IP Law PLC

(57) ABSTRACT

A cutting tool assembly having a tool holder and a cutting tool. The cutting tool has a shank that is matingly received within an axial bore in the lower end of the tool holder. The shank includes an eccentrically-shaped driver portion. The tool holder's axial bore includes an enlarged eccentrically-shaped drive opening which is complementary in shape to, but slightly larger than, the driver portion. When the shank is inserted into the axial bore, the driver portion and drive opening are aligned allowing the cutting tool to be partially rotated relative to the tool holder. This partial rotation abuts a portion of the eccentric driver portion against the drive opening wall to provide rigid support of the cutting tool against further rotation as the tool assembly cuts. A cammed fastener releasably interlocks the partially rotated cutting tool within the tool holder.

13 Claims, 4 Drawing Sheets

CUTTING TOOL WITH AN ECCENTRIC DRIVE AND PINNED FASTENER WITH DE-BINDING RELEASE FEATURE

CROSS-REFERENCE TO RELATED APPLICATIONS

This application is a continuation-in-part of Ser. No. 12/400,176 filed Mar. 9, 2009, which is a continuation-in-part of U.S. Pat. No. 7,527,459.

FIELD OF THE INVENTION

This invention is related to a tool holder assembly having a tool holder and an interlocking cutting tool with an improved pinned connection which has angled surfaces to draw the coupled components together and a de-binding feature to push the components apart.

BACKGROUND AND SUMMARY OF THE INVENTION

The present invention provides a novel coupling or interlocking feature for mechanical applications, namely a tapered pin passing laterally through a hollow body and a telescopically received insert. The insert includes a tapered upper surface which is forced upwardly further into a socket when the pin is passed further into the insert. The pin includes an enlarged forward head which, during disengagement, abuts the upwardly drawn insert when the pin is withdrawn and pushes downwardly to direct the insert out of the body.

In one non-limiting embodiment, a tool holder assembly is connected to a conventional drive spindle. The tool holder is received in a rotatable spindle. The tool holder has an elongated body having an axial bore in the lower end. The cutting tool includes a stepped shank that is telescopically received in the body. A retention sleeve cooperates with a tapered pin to releasably interlock the cutting tool to the tool holder body by drawing the cutting tool into a contoured axial opening in the body.

In my previous U.S. patent application Ser. No. 11/619,666 filed Jan. 4, 2007, which is incorporated herein by reference, I described a cutting tool shank and the tool holder having complementary polygonal drive sections that ensure that there are multiple flat surfaces that create an interference fit upon rotation of the cutting tool and resist deflection when the cutting tool is cutting. The interference fit provided a desired resistance to deflection or rigidity between the removable cutting tool and the machine mounted tool holder. This polygonal drive section, however, utilizes an axially mounted threaded member or "drawbar" that pulls the cutting tool into the tool holder. While the drawbar configuration is effective to rigidly mate the cutting tool and tool holder, the tool holder must be removed from the spindle to change cutting tools.

The present invention eliminates the drawbar while providing a rigid interference fit between the cutting tool and tool holder. Complementary oval or elliptical shaped drive portions are provided allowing the cutting tool to partially rotate within the tool holder until opposite facing portions of the outer wall of the oval section of the cutting tool's shank abut a complementary-shaped, albeit slightly larger, inner wall of an opening in the tool holder.

The present invention further includes a cylindrical retention sleeve which is received within the tool holder opening ahead of the cutting tool shank. The sleeve includes an eccentrically shaped opening that receives a lobed head on the end of the shank prior to rotating the shank within the tool holder, once the shank is rotated within the tool holder and the drive portions abut, the lobed head is locked axially within the eccentric sleeve opening.

The broad purpose of the present invention is to provide a novel mechanical coupling which secures and ejects a telescopically received insert within a surrounding body.

Another broad purpose of the present invention is to provide a tool holder chucking structure providing a positive drive member and limiting movement of the cutting tool relative to the tool holder while allowing the cutting tool to be quickly connected and disconnected from the tool holder.

It is an advantage of the present invention to provide a mechanical coupling between a telescopically received insert and a surrounding hollow body. The mechanical coupling having tapered forward and rearward surfaces which engage mating surface to draw the insert and body together and to disengage the insert from the body.

It is another advantage of the present invention that the he coupling includes a pin having a conically tapered rearward end which is passed transversely through both the body and an aperture in the insert. The tapered rearward end abuts a similarly tapered upper surface of the insert aperture directing the insert further into the body. A narrow stem projects from the tapered rearward end and terminates at an enlarged head at the forward forward end of the pin. The enlarged head having a rearwardly-facing sloped surface.

It is still another advantage of the present invention to provide a cutting tool to tool holder interface having two distinct sections: an oval interface and a tapered interface.

It is yet another advantage of the present invention to include a third cylindrical interface between the cutting tool and tool holder that resists movement of the cutting tool along the angled profile of the tapered interface.

It is yet still another advantage of the present invention to provide a quick disconnect feature allowing the cutting tool to be rapidly and easily removed from and attached to the tool holder to minimize machine downtime.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views, and in which.

DETAILED DESCRIPTION OF THE INVENTION

Figure 1:
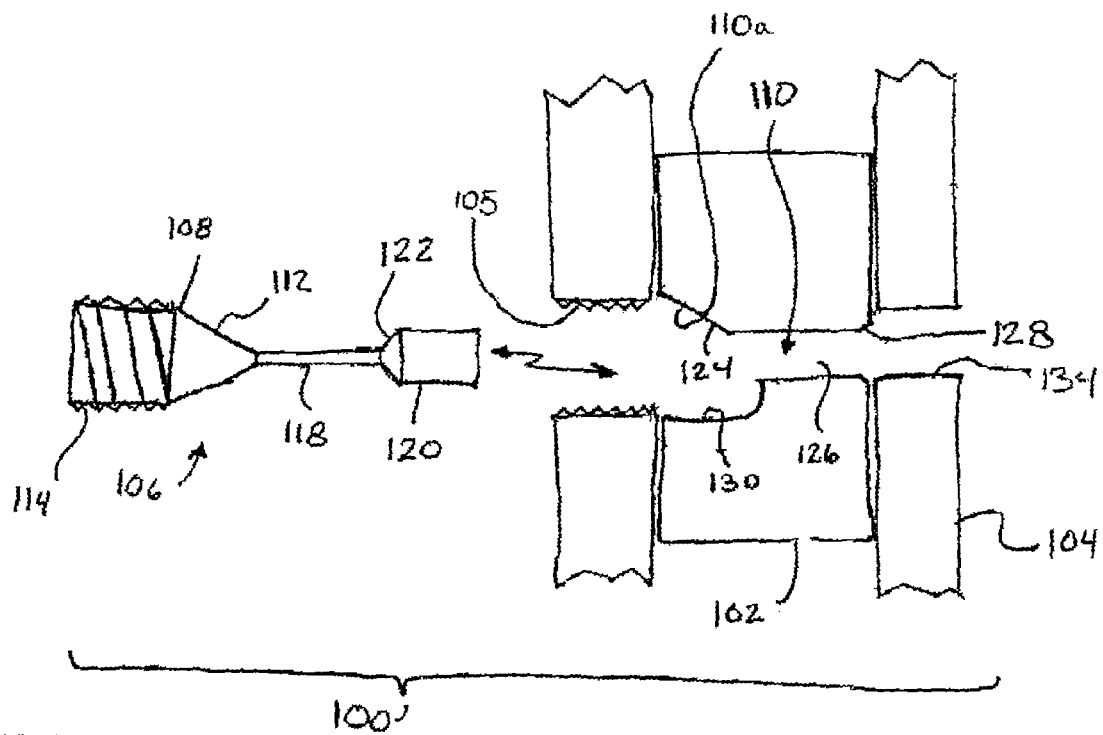
FIG. 1 is partial exploded side sectional view of the mechanical coupling with camming pin, insert and body.
Figure 2:
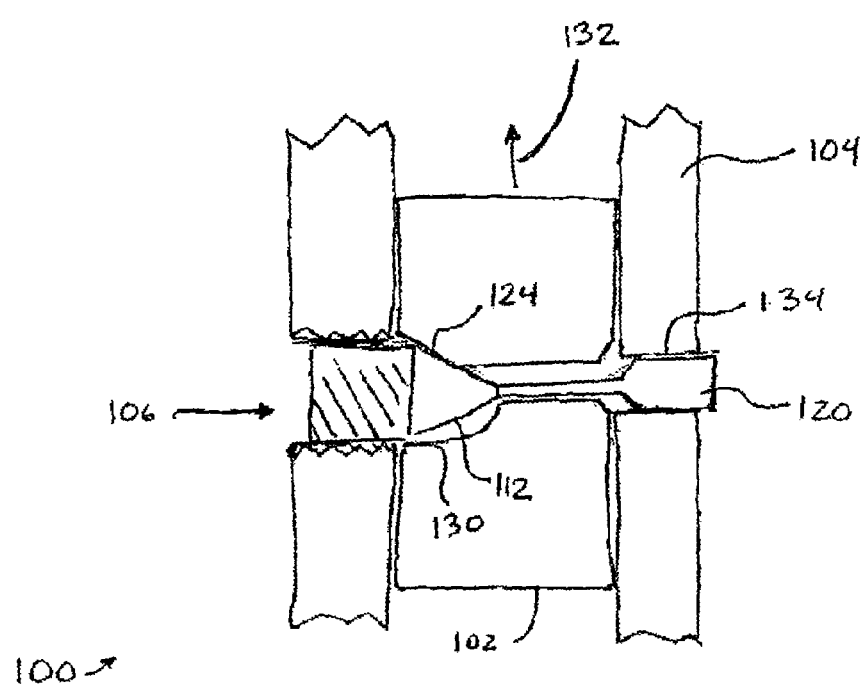
FIG. 2 is an assembled view of the coupling of FIG. 1 with the coupling in a post-rotated position and the camming pin tightened to draw the insert into the hollow body.
Figure 3:
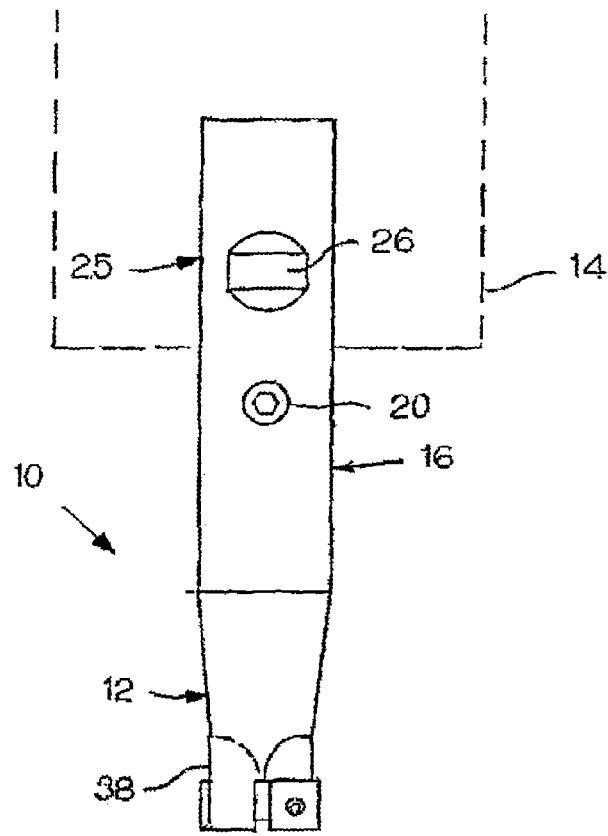
FIG. 3 illustrates a cutting tool assembly embodying the invention.

Referring now to FIGS. 1 and 2 a mechanical coupling 100 between a telescopically received insert 102 and a surrounding hollow body 104 is illustrated. The mechanical coupling 100 having tapered forward and rearward surfaces which engage mating surfaces to draw the insert 102 and body 104 together and to disengage the insert from the body.

Coupling 100 includes a pin 106 having a conically tapered rearward end 108 which is passed transversely through both the body 104 and an aperture 110 in the insert 102. The rearward end 108 has a forward-facing conical tapered surface 112 extending from a threaded stud 114. A narrow stem 118 projects from the conical portion 112 of rearward end 108 and terminates at an enlarged head 120 at the forward end of the pin 106. The enlarged head 120 having a rearwardly-facing conical sloped surface 122.

Insert 102 has includes a through bore 110 passing through the outer walls of the insert perpendicular to the longitudinal axis of the telescoping coupling 100. A first end of through bore 110 has a tapered frusto-conical cross-sectional shape 124 along the upper surface 110a of inlet the pin-receiving aperture 110. In the preferred embodiment, the first end of the bore 110 narrows to a substantially cylindrical minor bore 126. The minor bore 126 preferably terminates at a chamfered edge 128. The lower half of the aperture inlet has a relief 130 formed by an enlarged opening that extends both axially and radially further into the insert 102 than the opposing tapered surface 124 (i.e., the relief 130 is larger in both depth and width than tapered surface 124).

It should be appreciated that tapered portions 112 and 124 are sized to functionally abut against each other directing the insert 102 further into the body 104 (in the direction of arrow 132) when the pin is inserted further into the insert (when the threaded pin is tightened. To facilitate the camming/lifting of the mating pin 106 and conical bore 110, the lower portion 130 of the first end is sized to prevent the camming surface 112 from engaging any portion of the insert but the counterpart upper camming surface 124.

Importantly, stem 118 and head 120 are sized to fit within bore 110 such that when insert 102 is inserted within the hollow bore 104a of body 104 and camming pin 106 is passed through bore 110, head 120 is received within a complementarily shaped aperture 134 formed in the body 104, and upon rotation of the camming pin 106 (e.g., tightening pin), the tapered camming surface 112 abuts the tapered portion 124 of bore 110 resulting in the insert 102 moving upward in the direction of arrow 132 within axial bore section 30.

Figure 14:
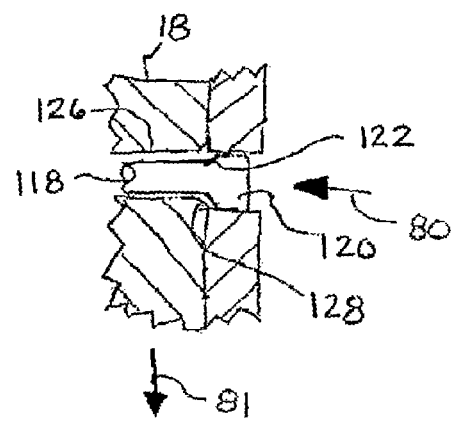
FIG. 14 is an enlarged side sectional view showing the camming pin engaging the retention sleeve after the sleeve is drawn into the cutting tool's shank to release the cutting tool from the tool holder.

As best shown in FIGS. 2 and 14, when camming pin 102, 20 is tightened and insert/sleeve 102, 18 is deflected further into the body (e.g., further into section 30), the forward chamfered edge 128 is aligned with the tapered surface 122 of the enlarged head 120. When the camming pin 106 is loosened, these aligned surfaces 128, 122 engage resulting in the inset/sleeve 102, 18 deflecting downwardly in direction of arrow 81 (i.e., out of section 30), thereby disengaging the insert/sleeve from the body. This disengagement is beneficial in that in most mechanical couplings, the coupled components will oftentimes bind together making their separation difficult. The positive abutment of the sliding surfaces 128 and 122 operates to disengage and drive the insert/sleeve 102, 18 to overcome any such binding.

Referring now to the FIGS. 3-14, a preferred tool assembly 10 is illustrated for joining a cutting tool 12, such as an end mill, to a rotatable drive spindle 14, shown in phantom. The tool can be any of a variety of rotatable cutting tools. The spindle is conventional and is used in a variety of commonly used turning or machining centers. For the purposes of this invention disclosure the term oval and oval-shaped shall be considered to describe any continuous, non-circular, closed plane curve, and generally including an ellipse or elliptical shape.

Figure 4:
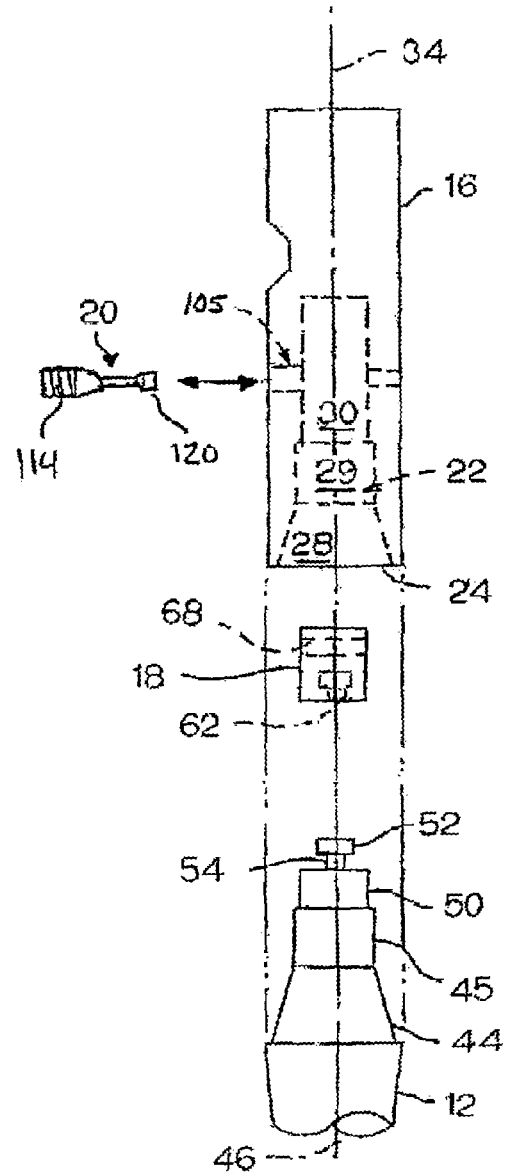
FIG. 4 is an exploded view of the major components of the tool assembly.
Figure 5:
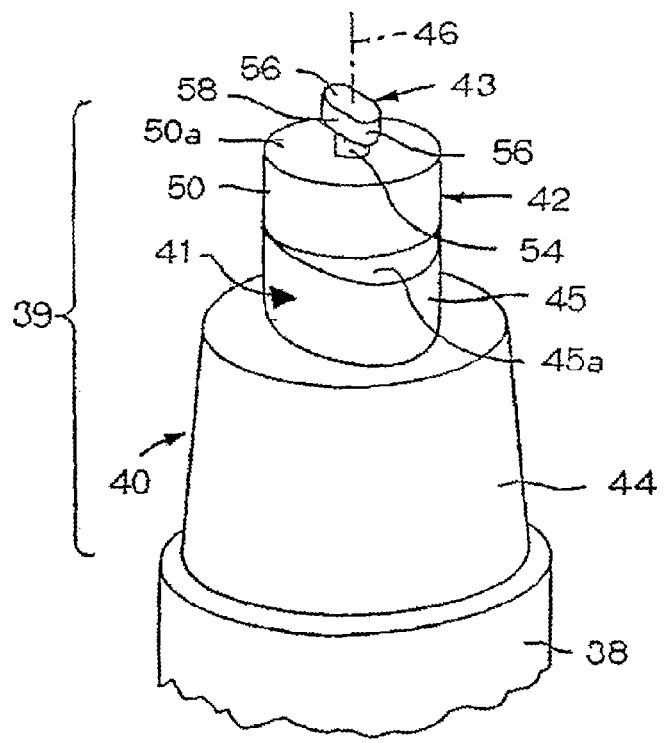
FIG. 5 is an enlarged partial perspective view of the upper shank end of the cutting tool.

As shown in FIG. 4, tool assembly 10 comprises a cutting tool 12, a tool holder 16, a retention or draw sleeve 18 and a camming pin 20. In this preferred embodiment sleeve 18 is has substantially the same features as the above-referenced insert 102 with the features following the same numbering convention as those of the generic insert 102, but shown in a tool holder application. Similarly, the camming pin 20 is substantially the same as pin 102 described above, but shown in a tool holder application.

Tool holder 16 is an elongated generally cylindrical bar having a stepped axial bore or opening 22 formed into its bottom end 24. The outer surface 25 of the tool holder 16 is preferably sized to be received within a machine tool spindle, such as spindle 14, or other type of chucking device. Tool holder 16 may also include additional chucking features such as a set-screw receiving recess or flat portion 26. It should be appreciated that while the present invention is illustrated having a substantially cylindrical spindle mating upper end, the upper end of tool holder 16 can be made having various spindle mating shapes and sizes, such as a conventional CAT style v-flange configuration.

Figure 7:
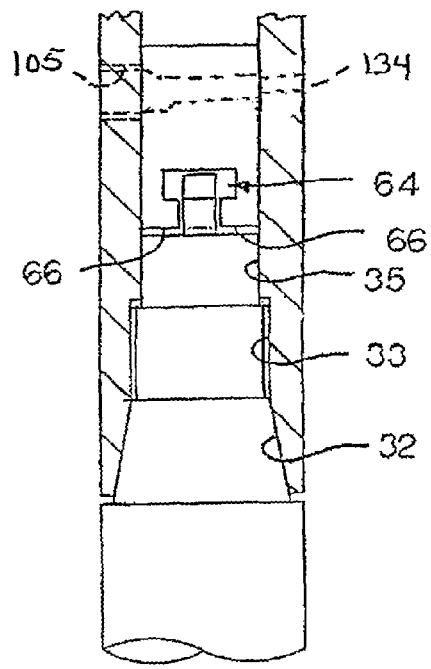
FIG. 7 is a longitudinal sectional view through the tool assembly of FIG. 1 with the cutting tool in a pre-rotated position.
Figure 8:
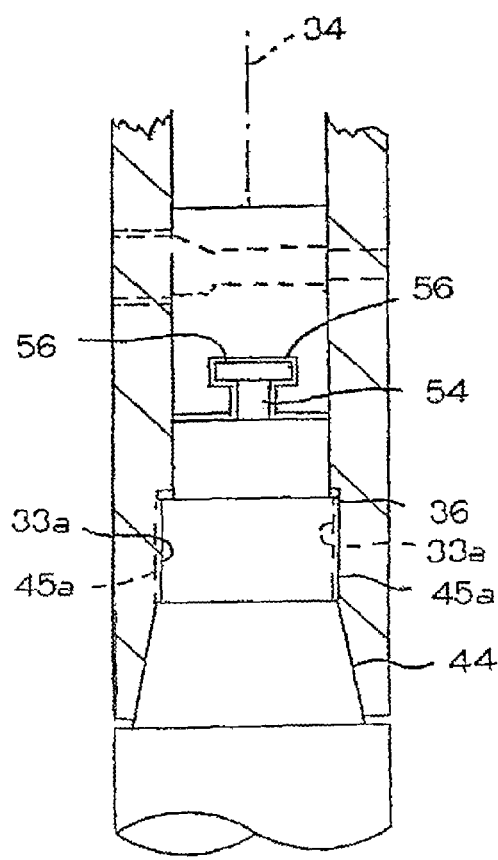
FIG. 8 is a longitudinal sectional view through the tool assembly of FIG. 1 with the cutting tool in a post-rotated position.

Axial bore 22 has a stepped, shank-receiving profile that is divided into three distinct sections 28, 29, and 30. Referring to FIGS. 4, 7 and 8, axial bore 22 at its lower-most end of the elongated body of tool holder 16 opens into tapered or conical section 28. Walls 32 of section 28 narrow radially inward to drive section 29.

Figure 9:
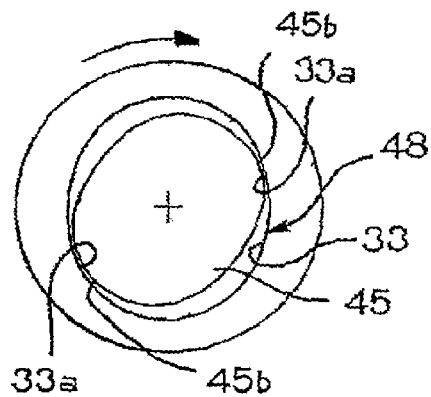
FIG. 9 is a sectional view as seen along lines 9-9 in FIG. 11, illustrating the driver portion in a post-rotated abutting engagement with the drive walls of the tool holder's axial opening.
Figure 10:
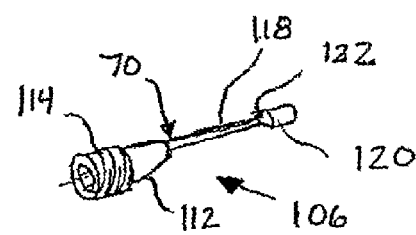
FIG. 10 is a perspective view of the camming pin.
Figure 11:
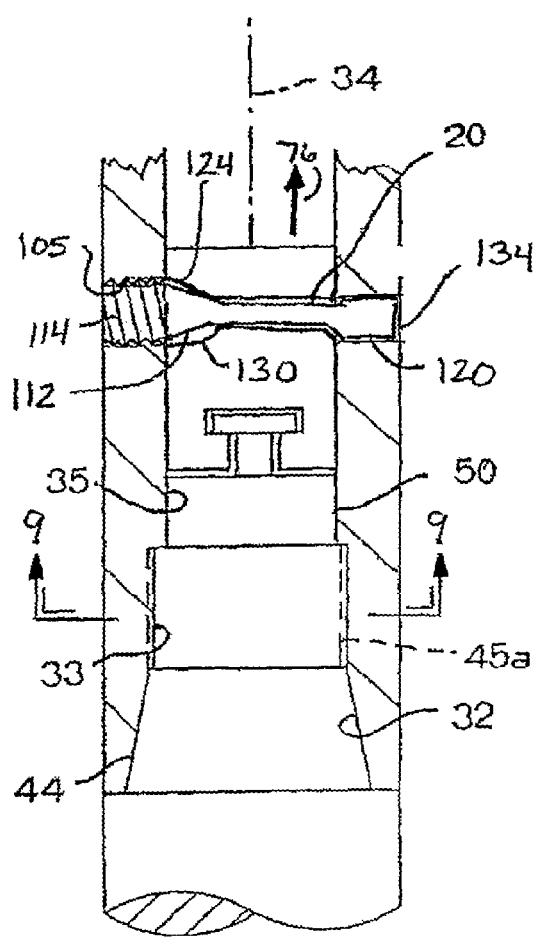
FIG. 11 is a longitudinal sectional view through the tool assembly of FIG. 1 with the cutting tool in a post-rotated position and the camming pin tightened to releasably interlock the cutting tool to the tool holder by wedging their complementary tapered sections together.

Drive section 29 of axial bore 22, as best illustrated in FIG. 9, is defined by a drive wall 33 having an eccentric cross-sectional shape with a pair of opposed drive members 33a extending radially inward to define a generally oval cross-sectional shape. Drive wall 33 runs parallel to the longitudinal axis 34 of bore 22.

Referring back to FIGS. 4, 7 and 8, drive section 29 runs to the cylindrical support section 30. In section 30 of axial bore 22, the oval shaped walls of section 29 terminate and steps down to cylindrical wall 35. Cylindrical wall 35 preferably has a diameter that is smaller than the length of the minor axis of the oval-shaped drive section 29. In this manner, an annular seat 36 is formed between drive section 29 and support section 30.

Tool holder 16 also has a lateral lock-pin aperture 105 formed through the outer surface perpendicular to axial bore 22. Aperture 105 intersects the cylindrical support section 30 and is preferably tapped at one end to receive a threaded body.

Referring now to FIGS. 3-9, cutting tool 12 is illustrated. Cutting tool 12 includes a lower end 38 that presents a cutting edge to a workpiece. It should be appreciated that lower end 38, shown in FIG. 3, as an indexable insert-based end mill is for illustrative purposes only and that any type of rotating cutting tool can be used.

The upper end of cutting tool 12 is a stepped shank 39 having four portions 40, 41, 42, and 43 which are telescopically received within axial bore 22. The first three portions 40, 41, and 42 being generally complementary in shape to axial bore sections 28, 29, and 30, respectively. As will be described in greater detail below, the tool holder's drive section 29 and its shank counterpart 41, while being substantially the same cross-sectional shape, are sized to permit a limited amount of rotational movement when the shank 39 is received within bore 22. The fourth portion 43 cooperates with the retention sleeve 18 to releasably interlock the cutting tool 12 to the tool holder 16.

Portion 40 extends axially from lower end 38 as a frusto-conical wall 44 that tapers inwardly from a larger diameter where portion 40 meets lower end 38 to driver portion 41.

Extending away from tapered portion 40 is tool driver portion 41. Portion 41 has a driver wall 45 that extends axially from the upper-most end of the tapered portion 40 parallel to the longitudinal axis 46 of cutting tool 12

Figure 6:
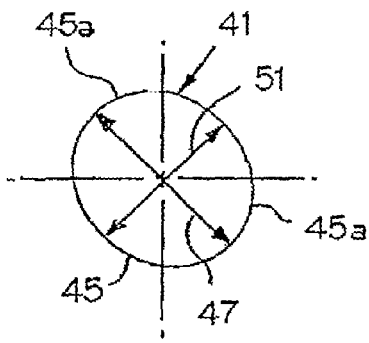
FIG. 6 is cross-sectional view through the driver portion of the shank.

As best shown in FIGS. 6 and 9, driver wall 45 has an eccentric or oval cross-sectional shape with a pair of lobes 45a extending radially from diametrically opposed sides of a central generally cylindrical hub. These diametrically opposed projections preferably project to define a uniform oval shape, such as an ellipse. This oval shape having the same general configuration as drive section 29 while being slightly smaller in size than the opening in drive section 29. That is, a ratio of the lengths of the minor and major axes of the driver portion 41 is preferably equal to the ratio of the minor and major axes of the drive section 29.

In the preferred embodiment, drive section 29 has an oval cross-sectional shape having a longer major axis and a shorter minor axis. Importantly, while the minor and major axis lengths of the shank's driver portion 41 are smaller than their axial opening drive section 29 counterparts, the length of the major axis, denoted 47, of the shank's driver portion 41 is larger than the length of the minor axis, denoted 48, of the axial bore's drive section 29. In this manner, when the driver portion 41 is mated within the drive section 29, the cutting tool 12 is permitted to rotate a limited amount within the axial bore 22 until a leading surface 45b of the driver wall 45 abuts drive member 33a of the tool holder's drive wall 33. In the preferred embodiment, the oval-cross sections of both the drive section 29 and the driver portion 41 are elliptical causing two surfaces 45b located on opposite sides of the driver wall 45 to simultaneously abut opposing portions 33a of the drive wall 33.

Referring to FIGS. 4, 5, 7, and 8, portion 42 of shank 39 is a cylindrical support shaft 50 that extends axially from the oval driver portion 41. Shaft 50 is sized complementary to support section 30 in axial bore 22 and is preferably a slip fit. The cross-sectional diameter of support shaft 50 is preferably equal to the length of the minor axis, denoted 51, of the adjacent driver portion 41 resulting in the upper surface of the driver portion 41 forming a shoulder 41a as the major axis 47 of the oval driver portion extends radially beyond shaft 50.

The tight fit between section 30 and support shaft 50 prevents the cutting tool from tilting or rotating along the complementary tapered walls 32 and 44.

Shank 39 terminates at a fastener portion 43, which extends from the upper face 50a of the cylindrical support shaft 50. Fastener portion 43 includes an oblong fastener head 52 projecting from a cylindrical neck 54, which extends axially from shaft 50. Head 52 is oblong having a pair of lugs 56 projecting radially in opposite directions from a central circular hub 58. In the preferred embodiment, the two lugs 56 are aligned with and extend radially from longitudinal axis 46 in the same direction as the major axis 47 of the driver portion 41.

Tool assembly 10 also includes a retention sleeve 18. Sleeve 18 is a cylindrical rod 60 having a diameter approximately equal to the diameter of support shaft 50 resulting in rod 60 being telescopically receivable in support portion 30 of the tool holder in a slip-fit relationship.

The bottom end of rod 60 has an oblong opening 62 shaped complementary to and sized to allow fastener head 52 to pass therethrough. An enlarged circular opening 64 depends from oblong opening 62 allowing the head 52 to rotate freely within rod 60 when head 52 and neck 54 are inserted into openings 62, 64. As best shown in FIGS. 7 and 8, the oblong shape of opening 62 and the adjacent enlarged opening 64 create a pair of opposed radially inwardly projecting flanges 66 that prevent the fastener head 52 from being moved axially when the cutting tool 12 is partially rotated relative to the sleeve 18. When head 52 is realigned with oblong opening 62, the cutting tool is removable from the sleeve 18.

Figure 12:
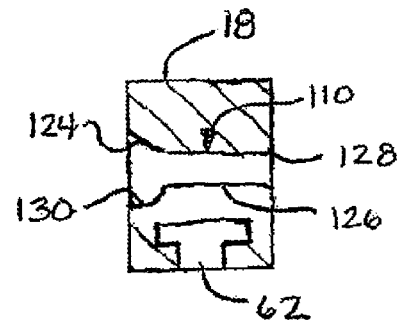
FIG. 12 is a sectional view illustrating the tapered camming pin bore in the sleeve.
Figure 13:
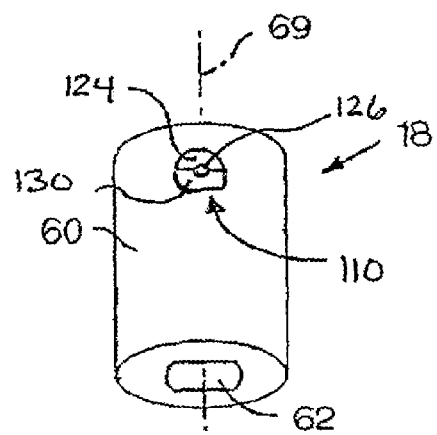
FIG. 13 is a perspective view of the bottom end of the retention sleeve.

Sleeve 18 includes a through bore 110 passing through the cylindrical outer walls perpendicular to the longitudinal axis of the cylindrical rod 60. As best shown in FIG. 12, a first end 110a of through bore 110 has a tapered frusto-conical cross-sectional shaped surface 124 along the upper portion of the aperture's inlet. In the preferred embodiment, first end narrows to a substantially cylindrical minor bore 126. The minor bore 126 preferably terminates at a chamfered edge 128.

Referring now to FIGS. 4 and 10-12, tool 10 further includes a camming pin 20 with an elongated body 70 having a conically tapered outer camming surface 112. The camming surface 112 narrows to a cylindrical minor body 118 which runs to an enlarged forward cylindrical support head or post 120. The rearward end includes a threaded fastener portion 114 adjacent to the camming surface 112. The transition 122 between minor body 118 and post 120 is tapered outward to the cylindrical outer wall of post 120. The outer wall of post 120 is sized to fit within the untapped aperture end 134 while threaded portion 114 is sized to threadably mate with tapped portion 105.

It should be appreciated that tapered portions 112 and 124 are sized to functionally abut against each other wherein continued tightening of the pin 20 into the tool holder 16 results in the sleeve 18 translating along axis 34, thereby pulling the cutting tool 12 into the tool holder. To facilitate the camming/lifting of the mating pin 20 and conical bore 110a, the lower portion 130 of the first end (aperture inlet) is sized to prevent the camming surface 112 from engaging any portion of the sleeve but the camming surface 124.

Importantly, body 70 is sized to fit within bore 110 such that when sleeve 18 is inserted within section 30 of the axial bore 22 and camming pin 20 is passed through bore 110 and support post 120 is received within the untapped portion 134 in the tool holder 16, and upon rotation of the camming pin 20 (e.g., tightening pin), the tapered camming surface 112 abuts the tapered portion 124 of bore 110 resulting in the sleeve 18 to move upward in the direction of arrow 76 within axial bore section 30.

As best shown in FIG. 14, when camming pin 20 is tightened and sleeve 18 is deflected further into section 30, the forward chamfered edge 128 is aligned with the tapered surface 122 of post 120. When the camming pin 20 is loosened (moving in the direction of arrow 80, these aligned surfaces 122 and 128 engage resulting in the sleeve 18 deflecting downwardly in direction of arrow 81 (i.e., out of section 30).

Oblong opening 62 is formed into the bottom of sleeve 18 at a substantially ninety degree angle about axis 69 relative to through bore 68. In this manner, when sleeve 18 is locked within axial bore section 30, the oblong opening 62 and the major axis of the oval-shaped drive section 29 are substantially parallel.

During assembly, retention sleeve 20 is inserted within support section 30 with opening 62 facing down toward end 24 of the tool holder. Camming pin 20 is inserted through aperture 37 and bore 68. At this stage of the assembly, pin 20 is tightened into opening 37a to a point such that the camming surface 71 is remote from upper surface 68. As best shown in FIG. 7, shank 39 is telescopically received by axial bore 22. Fastener head 52 is inserted through the aligned oblong opening 62 and passes into enlarged opening 64; cylindrical support portion 42 slides into the lower end of support section 30; the oval driver portion 41 is received within drive section 29 with the two major axes of the oval shapes 30, 41 being substantially parallel; and the tapered portion 40 being received within complementary tapered section 28.

As best shown in FIGS. 8 and 9, to increase rigidity of the cutting tool 12 within tool holder 16, the cutting tool 12 is then partially rotated within tool holder until the leading surfaces 45b of the driver wall 45 abut the tool holder's drive wall 33. This rotation of the cutting tool concomitantly results in lugs 56 of the retention head 52 to overlap the inwardly projecting flanges 66 of the retention sleeve 18. In the preferred embodiment, the oval drive section 28 and driver portion 41 are sized such that their walls abut after an approximate ninety degree relative rotation occurs between the cutting tool 12 and tool holder 16. It should be appreciated that to best support the cutting tool 12 during a cutting operation, this relative rotation is in the opposite direction of the direction of the cut such that the abutting oval walls 33, 45 support the cutting tool and prevent any further rotation of the cutting tool 12 about the now-coaxial axes 34, 46 as a result of the cutting edge at end 38 machining a workpiece.

Once the walls 33, 45 are in abutting engagement, the assembly is completed by further rotating (e.g., tightening) camming pin 20 such that camming surface 112 engages upper surface 124 within the retention sleeve 18, thereby pushing the sleeve 18 further into the section 30, which in turn pulls the shank's fastener head 52 such that the cutting tool 12 and tool holder 16 wedge together at complementary conical surfaces 32, 44, thereby releasably coupling/locking the cutting tool to the tool holder.

It should be appreciated that a cutting tool to tool holder arrangement between shank 39 and the axial bore 22 is provided that forms three distinct interfaces including: mating conical surfaces that are compressed together by retention sleeve 18, at least one interference-fitting drive walls 33, 45 and a cylindrical support shaft 42 that cooperates with a complementary bore 30 to prevent cutting tool 12 from tilting or canting within tool holder 16.

When the user wishes to remove the cutting tool 12 from the tool holder, the camming pin 20 is loosened resulting in the tapered surface 122 of head 120 to engage the chamfered edge 128 of the sleeve 18. This sliding interference between the two tapered surfaces 122 and 128 eliminates any binding between the mating metal portions of the shank and tool holder and is effective to "kick" the cutting tool 12 loose after a cutting operation.

While the present invention has been described with particular reference to various preferred embodiments, one skilled in the art will recognize from the foregoing discussion and accompanying drawing and claims that changes, modifications and variations can be made in the present invention without departing from the spirit and scope thereof as defined in the following claims.

Having described my invention, I claim:

1. A tool assembly suited to be removably received into a rotatable spindle of a machine tool, comprising:
    a cutting tool having a cutter on one end and a shank on the opposite end,
    the shank including a eccentrically-shaped drive section having diametrically opposed drive lobes extending radially from a cylindrical drive body, a fastening portion extends axially from the drive section, the fastening portion including an oblong fastening head having diametrically opposed lugs;
    a tool holder having a generally cylindrical body with an axial opening in one end, the axial opening including a drive wall portion having opposed drive members that extend radially inwardly into the axial opening, whereby each drive lobe abuts one of the drive members when the cutting tool is partially rotated within the axial opening; and
    a second fastener portion contained within the axial opening and connected to the fastening portion of the cutting tool to axially move the cutting tool toward the tool holder body and telescopically receive the shank within the second end of the tool holder body, wherein the second fastener portion comprises:
    a retention sleeve having a cylindrical-shaped body sized to be telescopically received within the axial opening, the retention sleeve having a recess in one end which receives the fastening head, the recess being shaped to retain the fastening head axially when the cutting tool is partially rotated and the drive lobes abut the drive members, the retention sleeve including a bore passing perpendicularly there through relative to a longitudinal axis of the retention sleeve; and
    a camming pin having an tapered cam surface which is rotatable to engage an upper inner surface of the sleeve bore and pull the retention sleeve further into the axial opening.

2. The tool assembly as defined in claim 1, in which the shank includes a frustoconical section disposed between the cutter and the drive section, the frustoconical section having an external tapered wall that narrows from the end adjacent to the cutting means to the end that is adjacent to the drive section.

3. The tool assembly as defined in claim 1, in which the axial opening and a longitudinal axis of the cutting tool are aligned along a common axis when the shank is received within the axial opening.

4. The tool assembly as defined in claim 1, in which the drive lobes abut the drive members when the cutting tool is rotated approximately ninety degrees relative to the tool holder.

5. The tool holder assembly as defined in claim 1, wherein the drive lobes and cylindrical drive body cooperatively define an oval-shaped cross-section.

6. A tool assembly suited to be removably received within the spindle of a machine tool, comprising:
    a cutting tool having a cutter on one end and a shank on the opposite end;
    a tool holder including a spindle-mating portion having an external wall that is receivable in an opening of a rotatable drive spindle, and an elongated body which extends axially from the spindle-mating portion, wherein an axial opening is formed in the end of the elongated body opposite the spindle-mating portion and wherein the axial opening in the elongated body is shaped complementary to the shank to define a shank-receiving end;

wherein the shank includes a drive portion that, upon a partial rotation of the cutting tool relative to the tool holder after the shank is inserted within the axial opening, abuts a driver portion of the axial opening within the body and prevents the cutting tool from further rotating relative to a longitudinal axis of the axial opening;

a retention sleeve contained within the axial opening connected to the end of the shank to axially move the cutting tool toward the tool holder to releasably interlock the shank within the body, the sleeve having a cylindrical body sized to be telescopically received within the axial opening, the retention sleeve including a tapered bore passing perpendicularly therethrough relative to a longitudinal axis of the sleeve; and a camming pin having an tapered cam surface which is rotatable to engage an upper inner surface of the sleeve bore and pull the retention sleeve further into the axial opening.

7. The tool assembly as defined in claim 6, in which the shank includes a cone section disposed between the cutter and the drive portion of the shank, the cone section having an external conical wall that narrows from the end adjacent to the cutter to the end that is adjacent to the drive portion.

8. The tool assembly as defined in claim 6, in which the drive means has an oval-shaped cross-section.

9. The tool assembly as defined in claim 6, wherein the cutting tool has a certain direction of rotation when cutting, and wherein the partial rotation which abuts the drive portion to the driver portion is in the opposite direction as the cutting direction of the cutting tool.

10. The tool assembly as defined in claim 8, in which the driver portion has an inner wall that defines an oval-shaped opening shaped to receive the drive portion.

11. The tool assembly as defined in claim 10, in which the radial distance from a longitudinal axis to the vertex of the major axis of the oval-shaped drive portion less than the radial distance from the longitudinal axis to the vertex of the major axis of the oval-shaped driver portion opening and greater than the radial distance from the longitudinal axis to the vertex of the minor axis of the elliptical-shaped driver portion opening.

12. The tool assembly as defined in claim 6, wherein the retention sleeve has a recess in one end which receives an upper end of the shank, the recess being shaped to retain the shank axially when the cutting tool is partially rotated and the drive portion the driver portion.

13. A tool assembly suited to be removably received into a rotatable spindle of a machine tool, comprising:

a cutting tool having a cutter on one end and a shank on the opposite end, the shank including an oval-shaped drive section; and a tool holder having a generally cylindrical body with an axial opening in one end, the axial opening including an enlarged driver wall which defines an oval-shaped driver opening, the axial opening and driver opening being sized to telescopically receive the shank and drive section respectively to be concentric about a common longitudinal axis;

wherein the radial distance from the longitudinal axis to the vertex of the major axis of the drive section is less than the radial distance from the longitudinal axis to the vertex of the major axis of the driver wall and greater than the radial distance from the longitudinal axis to the vertex of the minor axis of the driver wall;

wherein a portion of the drive section abuts the driver wall when the cutting tool is telescopically received within, and then partially rotated relative to, the axial opening; and a fastener portion extending through the axial opening and connected to an end of the shank opposite to the cutter, the fastener portion including opposed tapered surfaces which abut and are effective to cause the shank to axially move further into the axial opening to releasably interlock the shank within the body.

* * * * *